March 11, 1941.　　　　S. HAYDEN　　　　2,234,491
METHOD OF MAKING ALUMINUM WARE
Filed June 4, 1938
Fig. 1
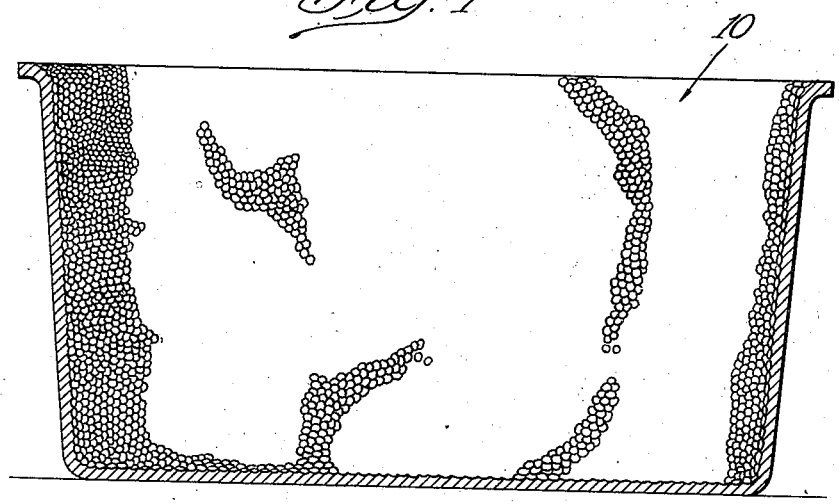
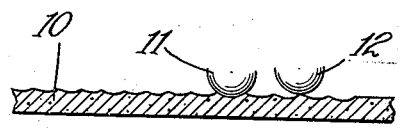
Fig. 2
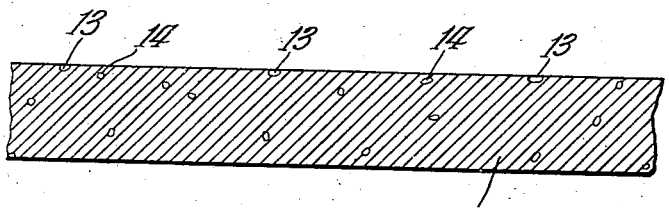
Fig. 3
Inventor:
Samuel Hayden
By: John Howard Smith
Atty.

Patented Mar. 11, 1941

2,234,491

UNITED STATES PATENT OFFICE 2,234,491

METHOD OF MAKING ALUMINUM WARE

Samuel Hayden, Chicago, Ill., assignor to Century Metalcraft Corporation, Chicago, Ill., a corporation of Delaware Application June 4, 1938, Serial No. 211,905

1 Claim. (Cl. 29—148.2)

This invention is directed to cooking ware, particularly to the production of improved aluminum utensils and to a method of enhancing the corrosion resistant properties of the inside, cooking surface thereof.

I have found that the lasting quality and the durability of the inside, cooking surface of an aluminum utensil is greatly improved when the strata of metal at the inside surface is compressed or compacted after the utensil has been formed into the desired shape.

One of the primary objects of the invention is to provide an improved aluminum cooking utensil having an inner, cooking surface in which the inherent porosity of the metal has been greatly reduced, which surface retains, to a greater extent than heretofore, its initial characteristic smoothness after the continued cooking therein of foods having corrosive ingredients.

Another object of the invention is to provide an improved aluminum utensil wherein the inner, cooking surface is to a high degree resistant to the progressive, corrosive deterioration known as "pitting."

A more specific object of the invention is to produce an improved utensil of the above character by compacting, compressing, or kneading the inner surface thereof to greatly reduce the inherent porosity of the aluminum at that surface.

In the drawing:

Fig. 1 shows a cross section of a utensil processed in acccordance with the present disclosure;

Fig. 2 is an enlarged cross section of a fragment of the utensil showing the details of the process disclosed herein for accomplishing the objects of the invention; and Fig. 3 is an enlarged cross section of a fragment of the metal previous to treatment by the instant method.

Changes and modifications of the illustrative disclosure herein may be made without departing from the spirit and scope of the invention set out in the appended claim.

Aluminum or aluminum alloys have proved generally satisfactory for the manufacture of cooking utensils due to their superior heat conducting characteristics and their extreme lightness. However, it is found that the inside surface of a utensil manufactured under the methods now in use, deteriorate after a limited amount of cooking therein. This deterioration is exemplified by what is known to the trade as "pitting," so called because of the formation of holes or pits on the inner surface of the utensil.

The pitting above referred to is a very serious problem in the use of aluminum ware, because the holes or pits collect residual food which cannot be readily removed therefrom by the cleaning methods available to the housewife. With this residual food present at the surface of the utensil an unsanitary condition exists, and furthermore the cooking qualities of the utensil are to a certain degree affected.

Under present methods, the inside of an aluminum utensil is finished by buffing and polishing to obtain a surface which appears to be extremely smooth, but which, microscopically, has a great number of minute interstices therein, the latter, in my opinion, being due to the inherent porous or cell like nature of the aluminum and being unavoidably present so long as only buffing and polishing is resorted to as the finishing process.

Surfaces prepared by the above method are well known to be subject to the above mentioned "pitting" corrosion, and as the pitting progresses a more unsanitary condition is created and a more unsatisfactory surface condition, generally, exists.

As previously stated, surfaces prepared under the now known methods are subject to pitting while extended experiments show that surfaces prepared in accordance with the herein disclosed method, which comprises compacting the metal, are improved in that they withstand the corrosive action which occurs during cooking more effectively and remain in substantially their original condition for much greater periods of time under like treatment.

It is my present belief that the enhanced corrosion resistant properties I obtain arise from the treatment whereby, initially, the degree of porosity at the cooking surface is greatly reduced. It is my further opinion that under prior methods, the collection of mineral salts and other corrosive ingredients from foods in the pores, and the inability of the user to clean such pores, gives rise to a condition under which, gradually, this residual material eats into the metal to eventually create the pits or holes referred to. With the present treatment this residual material is reduced to a minimum since the surface can be easily cleaned due to the lack of porosity, and therefore setting in of the pitting action is substantially obviated.

Consequently my invention contemplates the production of an improved aluminum utensil by preforming it into the desired general shape by casting, as is shown in Fig. 1 by the utensil 10, or by any other desired method.

Having so formed the utensil the inner, cooking surface thereof is then treated in such a manner that the porosity is materially reduced. This reduction of the porosity may be accomplished in many ways; however, one method which has been proved most effective is that of beating the surface progressively with means having a rounded, relatively blunt contacting surface. It will be understood that if done by hand this process is entirely too costly and therefore the same result may be accomplished by a bombardment process wherein substantially round, smooth shot engages the surface to be treated.

As previously stated, any method of treating the cooking surface to reduce porosity may be used. However, that disclosed herein is believed to be so highly effective for the reason that instead of simply compacting the outer strata of metal the latter is in effect kneaded. Referring to Fig. 2 it will be seen that as the relatively smooth, rounded surface 11 indents the surface of the utensil, movement thereof into the metal causes a spreading action which urges the adjacent metal in a horizontal direction. This lateral or horizontal shifting of the metal continues as the process is continued over the entire inner surface of the utensil, with the result that the pores are effectively squeezed or kneaded closed. From the figures, as at 12, it will also be seen that in many cases the ridges formed by the blows will be compressed, with the result that substantially the entire inner surface of the utensil is kneaded. It is to be noted that the surfaces 11 and 12 are of such a size that the indentations made thereby will be relatively broad and shallow and thus easily cleaned.

By reference to Fig. 3, in which the inherent porosity of the metal is depicted, it will be seen that a buffing, grinding, or polishing operation will result, not in the elimination or closing of the pores, but rather in the exposing of the same as shown at 13. In attempting to eliminate the exposed pores 13 by the previous grinding or polishing operation it will be seen that as the pores 13 are ground away, the pores 14, which lay in a lower strata of the metal, become exposed. In view of the fact that continued grinding or polishing in the past has been found to leave pores exposed at all times, it appears that the location of the pores is such that each level or strata of the metal contains a number of pores. Consequently, even though the grinding or polishing is extended over a continued period, exposed pores or pits will always be found in the surface. Consequently it will be readily understood that by the method disclosed herein, no attempt is made to cut off successive strata of the metal to eliminate pores, but rather the upper or inner strata is retained but is treated in such a way by compacting that the pores found therein will be closed. The grinding heretofore used has been accomplished by the use of an abrasive or some other cutting agency, and it is therefore generally found that a series of minute ridges and grooves constitute the inner surface of the utensil. These ridges and grooves have been found to retain corrosive substances and food in the same manner as have the exposed pores. By the method disclosed herein it will be readily understood that the finished surface is devoid of the ridge-groove contour or other irregularities, and is of a maximum smoothness.

I am aware of prior processes involving compacting of metals for other purposes, such as ornamentation, hardening and tempering, and of other uses for bombardment by shot. However, so far as I know, I am the first to discover that such treatment of the inner, cooking surface of an aluminum utensil will render the latter effectively corrosion resistant and will reduce deterioration of aluminum by "pitting."

Having thus described my invention what I claim as new and desire to secure by United States Letters Patent is:

A method of rendering an aluminum cooking utensil resistant to "pitting" which includes the steps of first preforming the utensil into the desired shape and then treating the inner, cooking surface thereof by kneading localized areas of said surface substantially laterally of the surface contour and continuing the kneading progressively over the surface.

SAMUEL HAYDEN.